United States Patent Office 2,993,876
Patented July 25, 1961

2,993,876
ETHYLENE POLYMER-POLYISOBUTYLENE COMPOSITION, METHOD OF MAKING SAME, AND ELECTRICAL WIRE COATED THEREWITH
Roger M. McGlamery, Bartlesville, Okla., assignor to Phillips Petroleum Company, a corporation of Delaware
No Drawing. Filed Apr. 22, 1957, Ser. No. 654,085
5 Claims. (Cl. 260—45.5)

This invention relates to a method of improving the stress cracking resistance of highly crystalline ethylene polymers.

In another aspect this invention relates to a blended composition comprising a highly crystalline ethylene polymer and having improved resistance to heat-stress cracking.

In one of its more specific aspects this invention relates to improved wire and cable coverings formed from highly crystalline ethylene polymers.

Ethylene polymers, particularly the homopolymer, are well recognized as excellent electrical insulating materials, especially in high frequency applications. Polymers of this type prepared under conditions of high temperature and pressure have a relatively low softening point of about 220 to 223° F., and their utility is restricted unless a protective jacket of some material, such as nylon, is provided. Improved ethylene polymers produced catalytically at considerably lower temperatures and pressures show many superior physical properties, such as higher softening temperature and improved resistance to chemical attack. These improved polymers, which are more crystalline than those produced under high pressures, have exhibited a tendency to crack or rupture when exposed to conditions of stress at elevated temperatures. While this type of failure, termed "heat-stress cracking," can occur in other applications, it is of particular importance in the insulation of electrical wiring which is subjected to elevated temperatures with winding, twisting, and tension, thereby developing high stresses in the coating material.

According to my invention, highly crystalline ethylene polymers are modified by the incorporation therein of high molecular weight polyisobutylene in substantial amounts, thereby improving the resistance of these polymers to heat-stress cracking. The improved polymeric blends of my invention in addition exhibit a remarkable impact strength without substantial loss of tensile strength and retain their original high softening temperature. I have also found that blends of my invention employing polyisobutylene having a molecular weight above about 200,000 in amounts of at least 15 and preferably at least about 20 weight percent exhibit an unexpected degree of improvement in resistance to environmental-stress cracking. By "environmental-stress cracking" I refer to the type of failure which is hastened by the presence of surface active agents in contact with the stressed polymer.

It is an object of my invention to provide an improved blend of highly crystalline ethylene polymer having resistance to heat-stress cracking. It is another object of my invention to provide a method of improving the stress cracking resistance of highly crystalline ethylene polymers. A still further object is to provide wire and cable coverings from ethylene polymers which have relatively high softening temperatures and improved resistance to heat-stress cracking. Other objects, advantages, and features of my invention will be apparent to those skilled in the art from the following description, examples, and appendant claims.

The value of polyethylene as an electrical insulating material is well recognized. It is light, flexible and has good dielectric properties. It is also easily extruded as a coating upon wires and other products. Although to date, the major commercial use has been with "high pressure" polyethylene, improved polyethylene resins have been developed with even better electrical characteristics plus the ability to withstand higher temperatures with greater rigidity and better resistance to chemical attack. These improved polyethylenes have a density of about 0.94, usually 0.96 and above, and a softening temperature in the range of about 250 to 270° F., and a crystallinity at 25° C. of about 90 percent and above.

For the practice of my invention this improved polyethylene or a copolymer of a mixture of monomers predominantly ethylene, produced by essentially the same methods as those which yield a polyethylene having the required physical properties, can be used. In a preferred method of preparing these ethylene polymers for my invention, ethylene is polymerized alone or with one or more monoolefinic comonomers having from three to twelve carbon atoms per molecule, preferably not over four carbon atoms. Usually when the higher molecular weight comonomers of from five to twelve carbon atoms are used, the percentage of these comonomers in the total monomeric material should not exceed 3 weight percent. Comonomers of three and four carbon atoms per molecule, for example, propylene, 1-butene, and 2-butene, can be employed in larger amounts, up to 30 weight percent of the total monomeric material being allowable. It is preferred, however, in order to realize more benefits from increased softening temperature of the thermoplastic coating, that even these lower molecular weight comonomers comprise not more than 20 and more preferably less than 15 weight percent of the total monomeric material.

Ethylene with or without these comonomers is polymerized in the presence of a catalyst comprising chromium, a portion of which is hexavalent (preferably at least 0.1 percent by weight of the total catalyst) as chromium oxide associated with at least one oxide from the group consisting of silica, alumina, zirconia, and thoria. The total chromium content of the catalyst is preferably between 0.1 and 10 weight percent. Polymerization is ordinarily carried out at a temperature between 150 and 450° F., and the pressure of the reaction can vary over a wide range, for example, from atmospheric pressure to 1,000 pounds per square inch absolute, or higher; however, generally this reaction is known as low-pressure polymerization. The reaction can be carried out in a gaseous phase; but when diluent is used the minimum pressure is that necessary to maintain the diluent in a liquid phase. Preferably a solvent is used which is liquid and inert under contacting conditions, such as hydrocarbon solvents, especially naphthenic hydrocarbons and paraffinic hydrocarbons of from 3 to 12 carbon atoms, for example, propane, normal pentane, isopentane, isooctane, cyclohexane and methylcyclohexane. In such cases the reaction pressure is ordinarily in the range of 100 to 800 pounds per square inch absolute. The effluent withdrawn from the reactor comprises a solution of polymer and solvent, and when slurry or suspended catalyst is used the effluent also contains catalyst. Unreacted monomers are removed by flashing, and the solution with or without the addition of more solvent is filtered, centrifuged or the like to remove the catalyst. The catalyst-free solution is then passed to suitable recovery steps for removal of the solvent, such as by evaporation or flashing; and solid polymer is recovered in these steps or by precipitation. For some applications catalyst can be allowed to remain in the finished polymer, so the catalyst removal step is optional. The solid polymer is ordinarily further processed in order to be placed in a form convenient for storage and shipping. Pellets or granules are suitable, and these can be prepared by extruding the polymer into strands which are then cut or chopped in a pelletizer.

Preparation of such polyolefins is more fully described in the copending application of Hogan and Banks, Serial No. 573,877, filed on March 26, 1956, now U.S. Patent 2,825,721 issued March 4, 1958. As disclosed in said patent, ethylene polymers can be prepared having a density as high as 0.99 and a crystallinity as high as 94 percent.

Copolymers suitable for the practice of my invention as produced by the above described process have a density of at least 0.93 and a softening temperature of at least 235° F. with a melt index of generally not over 20 and preferably in the order of 1 to 5 and below. When the amount of comonomer in the total monomer feed does not exceed 15 weight percent, these copolymers have a density of at least 0.94 and a softening temperature of at least 240° F. Preferred for my invention is the ethylene polymer containing not more than 3 weight percent of other monoolefins. This polymer has a density of at least 0.95, a softening temperature of about 260° F. and a crystallinity of not less than 80 percent at 25° C. as determined by nuclear magnetic resonance.

While the above-described process is the preferred manner for preparing the polymers for my invention, any process which will yield a polymer or copolymer having the required physical characteristics is satisfactory. For example, another suitable method is a low temperature, low pressure process in which the polymerization is effected in the presence of catalyst systems which preferably comprise an organometal derivative as one component. Such catalyst compositions can have two or more components, one component being an organometal compound, metal hydride, or a group I, II or III metal and the other component being a compound of a group IV to VI metal. With certain of the above two-component systems, an organic halide having 30 or less carbon atoms per molecule or a metal halide can be used advantageously as a third catalyst component. Specific examples of suitable catalyst systems are triethylaluminum and titanium tetrachloride, mixtures of ethylaluminum halides and titanium tetrachloride, titanium tetrachloride and sodium or magnesium, and titanium tetrachloride with lithium aluminum hydride and ethyl bromide.

Softening temperature as used in this specification and claims is determined by a method adopted from the method of Karrer, Davis and Dieterich, Industrial and Engineering Chemistry (Analytical Edition) 2, 96 (1930). "Softness" for a ploymer is determined as described in this article over a range of temperatures and plotted to form a curve showing softness increasing with temperature. The softening temperature is, by definition, the point at which the slope of the curve equals the tangent of 60 degrees.

Crystallinity is determined by nuclear magnetic resonance and critical values listed herein are determined at 25° C. This method of polymeric crystallinity determination is discussed and described by Wilson and Pake in The Journal of Polymer Science, 10, 503 (1953).

The polyisobutylene which is used in the improved blends of my invention is the high molecular weight polymer, for example having a molecular weight of about 100,000 and above, prepared by methods well known in the art. These polymers can be made by polymerizing isobutylene in a suitable diluent-refrigerant, such as liquid ethylene, in the presence of a suitable Friedel-Crafts type catalyst. A refrigerant such as solid carbon dioxide with or without an auxiliary diluent, such as ethyl chloride or other low freezing substances, can be used. Examples of suitable catalysts are gaseous boron trichloride or a dissolved active metal halide, such as ammonium chloride in solution in a low freezing solvent. This is a low temperature reaction occurring usually below −10° C. Generally the higher molecular weight materials are formed at temperatures even lower, such as −78° C. to −165° C. At a temperature of about −150° C. molecular weights in excess of 500,000 can be obtained.

One suitable commercial brand of polyisobutylene is known as "Vistanex polybutene" which is available in a variety of molecular weights in the range of about 80,000 to 300,000. These polybutenes and a method of molecular weight determination are described in an article by Thomas, Zimmer, Turner, Rozen and Frolich in Industrial and Engineering Chemistry, 32, 299 (1940). Molecular weight determinations as described therein are by the Staudinger Viscosity Method. This method as described in the above mentioned article can be used to determine the approximate molecular weight of polyisobutylenes for the practice of my invention as herein defined. The high molecular weight polymers used in the blends of my invention, i.e., those having molecular weights of about 100,000 to 1,000,000, preferably about 250,000 to 500,000, are rubbery solids which are tough, elastic materials having an elastic memory. Generally these polymers will not retain the shape of a mold when attempts are made to mold them.

Polyisobutylene is incorporated into the highly crystalline ethylene polymers described above in considerable quantities, for example at least 10 percent to 50 percent by weight and preferably 20 to 40 percent by weight of the total composition. I have found that when polyisobutylene having a molecular weight of about 300,000 is incorporated into polyethylene having a crystallinity of about 90 percent at 25° C. that a superior wire coating material is produced, having a high softening temperature of 250 to 270° F. and excellent resistance to both heat-stress cracking and environmental-stress cracking. When preparing the polymer compositions, the polyisobutylene is incorporated with the ethylene polymer by any convenient method such as by mixing on a hot roll mill or in an internal (Banbury) mixer. The blending operation is effected at a temperature above the softening point of the ethylene polymer and is continued until a homogeneous composition is obtained. Temperatures in the range of about 300 to 350° F. are generally satisfactory for the preparation of homogeneous compositions.

Wire is coated with the ethylene polymer or copolymer blends by techniques well known in the art. A preferred method of wire coating is by means of a standard plastics extruder fitted with a wire-coating cross-head through which the wire to be coated passes. In such an apparatus, the polymer is maintained at a temperature sufficiently high to keep it fluid, and as pressure is exerted by the screw in the extruder, the wire emerges coated with a continuous sheath of plastic. Another method of applying insulation to a conductor is by sandwiching the wire between two strips of calendered polymer ribbon and shaping the plastic around the wire with a pair of grooved steel rollers. Coating can also be applied by fusing a helical winding of calendered polymer film into a continuous coating upon the wire. In all of these coating operations, the polymer is worked while at a temperature considerably above its softening point.

It is important that the coating be cooled uniformly so that the surface material does not become rigid while the interior remains fluid. This results in the production of voids at the polymer-wire interface; and when the wire is used in electrical applications, such voids become points of ionization subjecting the polymer composition to degradation and break-down in dielectric strength. To achieve this uniform coating and avoid uneven density changes within the coating, it is preferred that the coatings be gradually cooled from the extrusion or working temperature to a temperature below their melting and softening temperatures. A thin coating such as would be applied to small wires can be passed directly into cooling water since a uniform cooling for such a film can be effected fairly rapidly. However, if the coatings are fairly thick, for example about 0.05 inch, they should be cooled gradually in order to insure an even cooling within the film. It is most important to avoid a quenching effect for such coatings. Slow cooling provides a further advantage by producing greater rigidity in the polymers used for my invention.

The advantages of this invention are illustrated by the following examples: The reactants and their proportions and other specific ingredients and conditions are presented as being typical and should not be construed to limit the invention unduly.

EXAMPLE I

Ethylene was polymerized in the presence of chromia-silica-alumina catalyst in a series of runs employing 20 and 60 gallon reactors. The range of operating conditions for these runs is shown below:

|  | 20 Gallon Reactor | 60 Gallon Reactor |
|---|---|---|
| Temperature, ° F. | 280-285 | 280-281 |
| Pressure, pounds per square inch gage | 420 | 420 |
| Ethylene Feed Rate, pounds per hour | 9.1-9.3 | 19.6 |
| Cyclohexane Feed Rate, pounds per hour | 61 | 120 |
| Catalyst Concentration in Reactor, weight percent | 0.27-0.68 | 0.30-0.63 |
| Polymer Concentration in Reactor, weight percent | 7-9 | 6-7 |

Following the separation of solvent and catalyst from the reactor, effluent polymer was recovered and blended from the several runs to yield a polyethylene having the following properties:

| | |
|---|---|
| Volatiles, weight percent | 0.02 |
| Ash, weight percent | 0.02 |
| Melt index | 0.814 |
| Heat distortion, ° F. | 186 |
| Crystalline freezing point | 252±2 |
| Stiffness, pounds per square inch | 140,900 |
| Density, grams per cubic centimeter | 0.963 |
| Injection molded: | |
|    Tensile, pounds per square inch | 4,575 |
|    Elongation, percent | 31 |
| Compression molded: | |
|    Tensile, pounds per square inch | 4,645 |
|    Elongation, percent | 15 |
| Impact strength, Izod, foot pounds per inch notch | 3.0 |
| Crystallinity at 25° C., percent | >90 |
| Softening temperature, ° F. | >260 |

A high molecular weight polyisobutylene having a molecular weight of about 120,000 was blended with the above ethylene polymer containing 0.1 percent of 2,6-di-tert-butyl-4-methylphenol. Two blends were prepared on the mill, one containing 20 weight percent polyisobutylene and the other containing 30 weight percent. A homogeneous blend was formed. A wire was coated with the blended compositions by extruding the molten blends onto the wire. The wire and coating was then cooled to approximately 25° C. at a slow enough rate to give void-free adhesion of the coating to the wire. Samples of wire coated with each blend and with a control sample of the polyethylene alone were tested by wrapping the coated wire around its own diameter and subjecting it to a temperature of 75° C. The time for surface cracks to appear in the coating was noted. The results of these runs are reported in Table I.

Table I

| Weight percent Polyisobutylene | Time for Surface Cracks to Appear (hours) |
|---|---|
| 0 | [1] 3-17 |
| 20 | [1] 48-63 |
| 30 | [1] 48-63 |

[1] Surface cracks appeared sometime during the time interval stated; for example, in the 20 percent polyisobutylene blend at the end of 48 hours no surface cracks had appeared, but on examination at 63 hours, surface cracks had appeared.

This test is considered much more rigid than actual field conditions, and therefore presents a useful means of comparing the benefits to be derived with polyisobutylene over the unmodified polymer.

EXAMPLE II

Ethylene was polymerized in a series of four runs in a 150 gallon reactor. The operating conditions for each of these runs were as follows:

| | Run 1 | Run 2 | Run 3 | Run 4 |
|---|---|---|---|---|
| Reactor Temperature, ° F. | 298 | 299 | 299 | 298 |
| Reactor Pressure, pounds per square inch gage | 420 | 420 | 420 | 420 |
| Ethylene Feed Rate, pounds per hour | 25 | 33 | 33 | 33 |
| Cyclohexane Feed Rate, pounds per hour | 161 | 200 | 200 | 200 |
| Catalyst Concentration in Reactor, weight percent | 0.07 | 0.07 | 0.07 | 0.09 |
| Polymer Concentration in Reactor, weight percent | 8.4 | 8.6 | 8.5 | 9.8 |

Following separation of the solvent and catalyst, polymers from each of the above runs were blended and the properties of three samples were determined, the average results being as follows:

| | |
|---|---|
| Density | 0.963 |
| Melt index | 0.683 |
| Crystalline freezing point, ° F. | 252±2 |
| Stiffness, pounds per square inch | 171,000 |
| Heat distortion, ° F. | 186 |
| Impact strength, Izod, foot pound per inch notch | 3.17 |
| Crystallinity, percent (at 25° C.) | >90 |
| Softening temperature, ° F. | >260 |

Polyisobutylene having molecular weights varying from about 100,000 to about 300,000 were blended with the above described polyethylene to form homogeneous compositions with a minimum of bleeding. Specimens of uniform dimensions were prepared from compression moldings which were cooled slowly from the molten state. The specimens were subjected to a test for environmental-stress cracking which consists of bending through 180° each specimen containing a razor slit on one side. The purpose of the slit is to create a condition of polyaxial stress. The specimen was then exposed to a test environment of concentrated Igepal (nonionic detergent, nonyl phenoxy polyoxyethylene ethanol) at 50° C. Several specimens prepared from each blend as well as control samples of unmodified polyethylene were subjected to this test and the time observed for 50 percent of the specimens to fail. The results of these runs are recorded in Table II. The environmental stress cracking test is made with specimens measuring 0.5 to 1.5 inches, 0.125±0.005 inch thick. The razor slit is centered on one face and longitudinal, 0.75 inch long and 0.02 to 0.025 inch deep. Specimens are bent with the slit on the outside and inserted in 150 x 18 mm. test tubes for exposure to the surface active agent.

percent concentrations of polyisobutylene as compared with the unmodified polyethylene are shown in Table III.

*Table III*

PHYSICAL PROPERTIES OF HIGHLY CRYSTALLINE POLYETHYLENE/POLYISOBUTYLENE BLENDS

|  | Polyethylene Control | Percent and Type of Polyisobutylene | | | | | |
|---|---|---|---|---|---|---|---|
|  |  | 10% A | 20% A | 10% C | 20% C | 10% D | 20% D |
| Impact, foot pounds per inch notch, ½ x ¼ bars | 2.93 | 2.53 | 14.1 | 5.26 | 10.1 | 8.13 | 16.6 |
| Tensile, pounds per square inch, Injection molded | 4,770 | 3,826 | 3,328 | 3,552 | 3,271 | 3,982 | 3,839 |
| Tensile, pounds per square inch, Compression molded | 4,694 | 3,553 | 2,846 | 3,195 | 4,685 | 3,503 | 2,543 |
| Elongation, percent, Injection molded | 34 | 35 | 65 | 35 | 57 | 50 | 88 |
| Elongation, percent, Compression molded | 20 | 6 | 48 | 10 | 10 | 40 | 84 |
| Heat Distortion, °F | 189 | 156 | 133 | 138 | 134 |  |  |
| Softening Temperature, °F | 262 | 262 | 262 | 262 | 263 | 264 | 256 |
| Flex Temperature, °F | +79 | +49 | −20 | +20 | 0 | +32 | −21 |
| Brittleness Temperature, °F | −184 | −87 | −87 | −89 | −184 |  |  |
| Stiffness, pounds per square inch | 138,500 | 135,000 | 89,000 | 108,000 | 114,300 | 98,000 | 74,000 |
| Melt Index | 0.844 | 0.676 | 0.529 | 0.585 | 0.465 | 0 | 0 |

*Table II*

ENVIRONMENTAL STRESS CRACKING OF POLYISOBUTYLENE—HIGHLY CRYSTALLINE POLYETHYLENE BLENDS IN IGEPAL[1] AT 50° C.

| Additive | Weight percent in Polyethylene | Hours for 50 percent Failure |
|---|---|---|
| None |  | 23 |
| Polyisobutylene A[2] | 10 | 54 |
| Do | 20 | 38 |
| Polyisobutylene B[2] | 10 | 54 |
| Do | 20 | 54 |
| Polyisobutylene C[2] | 10 | 54 |
| Do | 20 | 38 |
| Polyisobutylene D[3] | 10 | 24 |
| Do | 20 | 220 |

[1] Nonionic detergent.
[2] Polyisobutylene solid polymers having molecular weights between about 80,000 and 150,000 as determined by the method described above.
[3] High molecular weight polyisobutylene having a density of 0.91, a dielectric constant of 2.3 and a viscosity at 210° F. of 3700 centistokes. The inherent viscosity of this type of polyisobutylene has been determined to be 10.36. This value was obtained by dissolving 0.01 gram of the polyisobutylene in 50 milliliters of 1,2,3,4-tetra-hydronaphthalene. The flow time of this solution through an Ostwald-Fenske viscometer at 130° C. was compared to the flow time of the pure solvent through the same instrument at the same temperature to obtain relative viscosity from which inherent viscosity was calculated. From this figure a molecular weight of about 327,000 was calculated, using the method referred to above.

A shown by the above data, although some improvement in environmental-stress cracking is imparted by the lower molecular polyisobutylenes, a remarkable improvement is evident when employing the polyisobutylene D at the 20 percent level. An improvement of this degree was unexpected, and certainly not indicated by the prior art.

EXAMPLE III

Polyethylene prepared substantially as described in the previous examples and having approximately the same physical properties (density of about 0.96 and crystalinity at 25° C. of at least 90) was blended as described in the previous examples with polyisobutylene of varying molecular weights (Polyisobutylene A, molecular weight about 80,000; polyisobutylene C, about 120,000; and polyisobutylene D having a molecular weight of about 300,000). Physical properties of these blends at 10 and 20

As shown by the above data, high molecular weight polyisobutylene when blended with highly crystalline polyethylene according to my invention yields compositions having greatly improved impact strength and reduced flex temperature. These properties are gained without sacrificing softening temperature or tensile strength to a significant degree. Thus improved compositions are provided by my invention which are excellent electrical insulating materials for use in applications where elevated temperatures exist.

As will be evident to those skilled in the art, various modifications of this invention can be made, or followed, in the light of the foregoing disclosure and discussion without departing from the spirit or scope thereof.

I claim:
1. A composition of matter suitable for use as an electrical insulating material and having high thermal stability comprising about 60 to 80 parts by weight of ethylene polymer characterized by a density in the range of about 0.94 to 0.99 gram per cubic centimeter and a crystallinity in the range of about 80 to 94 percent at 25° C., and about 20 to 40 parts by weight of polyisobutylene characterized by a molecular weight of about 300,000.

2. The composition of claim 1 wherein said ethylene polymer is polyethylene having a density in the range of about 0.95 to 0.963 gram per cubic centimeter.

3. A method of preparing a composition of matter suitable for use as an electrical insulating material and having high thermal stability which comprise milling together about 60 to 80 parts by weight of ethylene polymer characterized by a density in the range of about 0.94 to 0.99 gram per cubic centimeter and a crystallinity in the range of about 80 to 94 percent at 25° C. and about 20 to 40 parts by weight of polyisobutylene characterized by a molecular weight of about 300,000, said milling being carried out at a temperature above 270° F.

4. The method of claim 3 wherein said ethylene polymer is polyethylene having a density in the range of about 0.95 to 0.963 gram per cubic centimeter and said milling temperature is in the range of 300 to 350° F.

5. Electrical wiring insulated with a coating of the composition of claim 2.

(References on following page)

References Cited in the file of this patent

UNITED STATES PATENTS

| | | |
|---|---|---|
| 2,339,958 | Sparks | Jan. 25, 1944 |
| 2,369,471 | Latham | Feb. 13, 1945 |
| 2,468,165 | Brister et al. | Apr. 26, 1949 |
| 2,692,257 | Zletz | Oct. 19, 1954 |
| 2,788,340 | Dannels | Apr. 9, 1957 |
| 2,854,435 | Briggs et al. | Sept. 30, 1958 |

FOREIGN PATENTS 514,687    Great Britain    Nov. 15, 1939

OTHER REFERENCES

Hahn et al.: "Ind. Eng. Chem.," 37, 526–533, June, 1945.

"Plastics," (Chicago), pages 12 and 29, December, 1948,

Neumann et al.: "Modern Plastics," August, 1955, pages 117–120 and 122.